Nov. 8, 1966    F. W. LÜCK    3,284,087
SEAL FOR SEALING AREAS OF DIFFERENT PRESSURES
WITH REGARD TO EACH OTHER
Filed Dec. 2, 1963    3 Sheets-Sheet 1
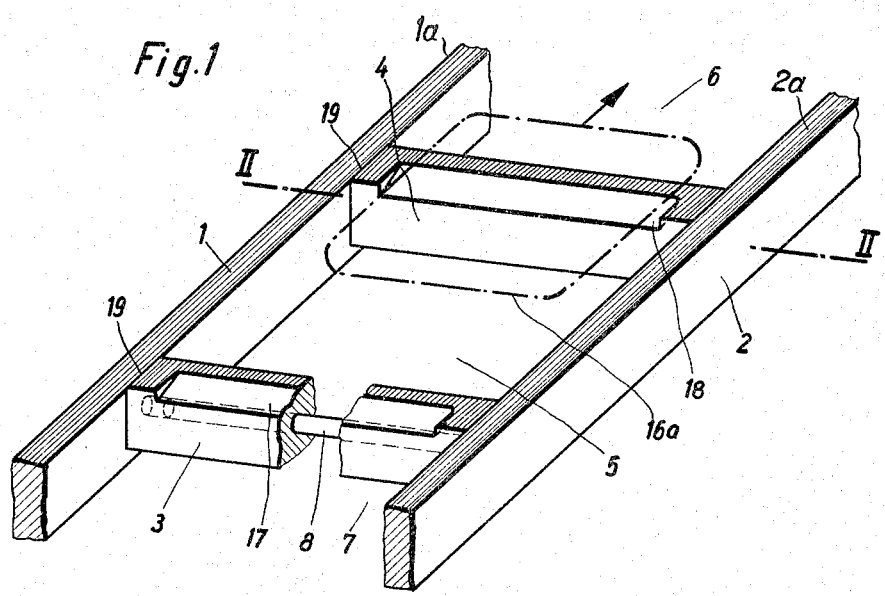
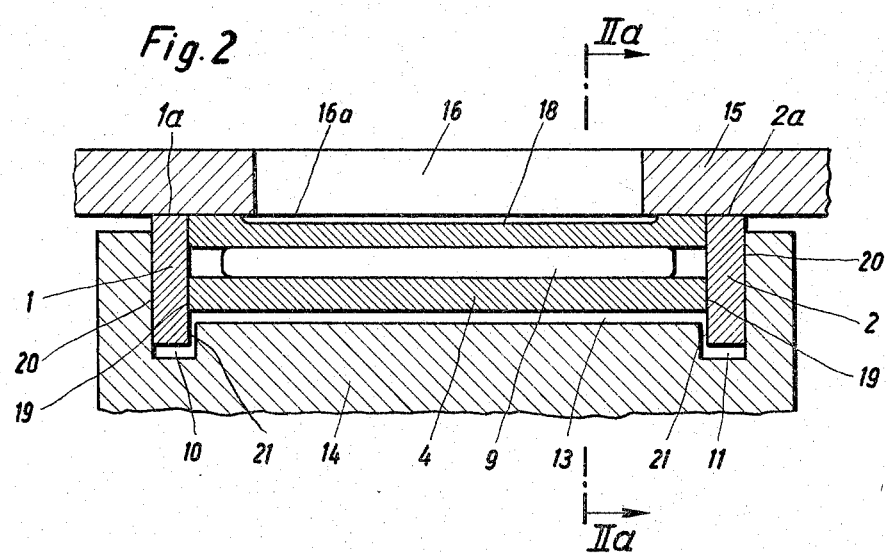

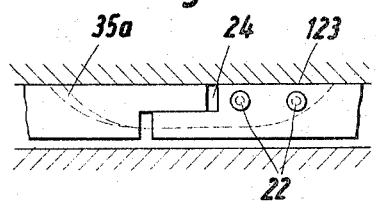
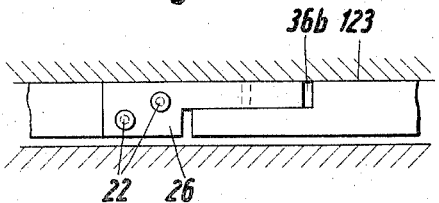
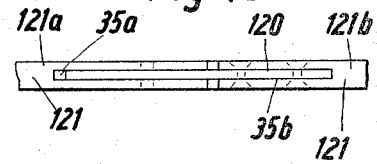
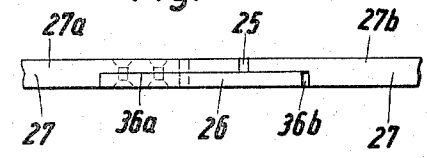
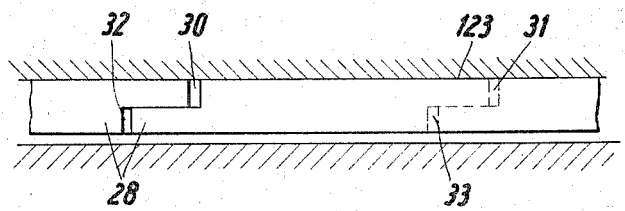
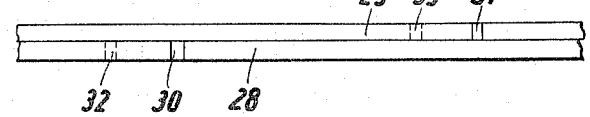
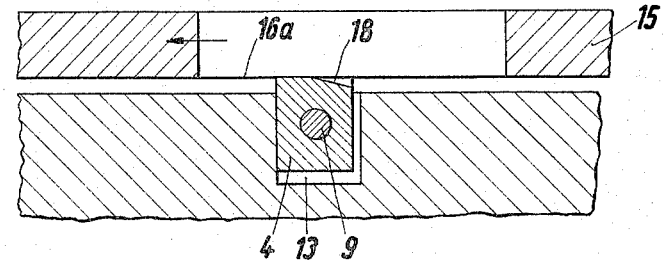

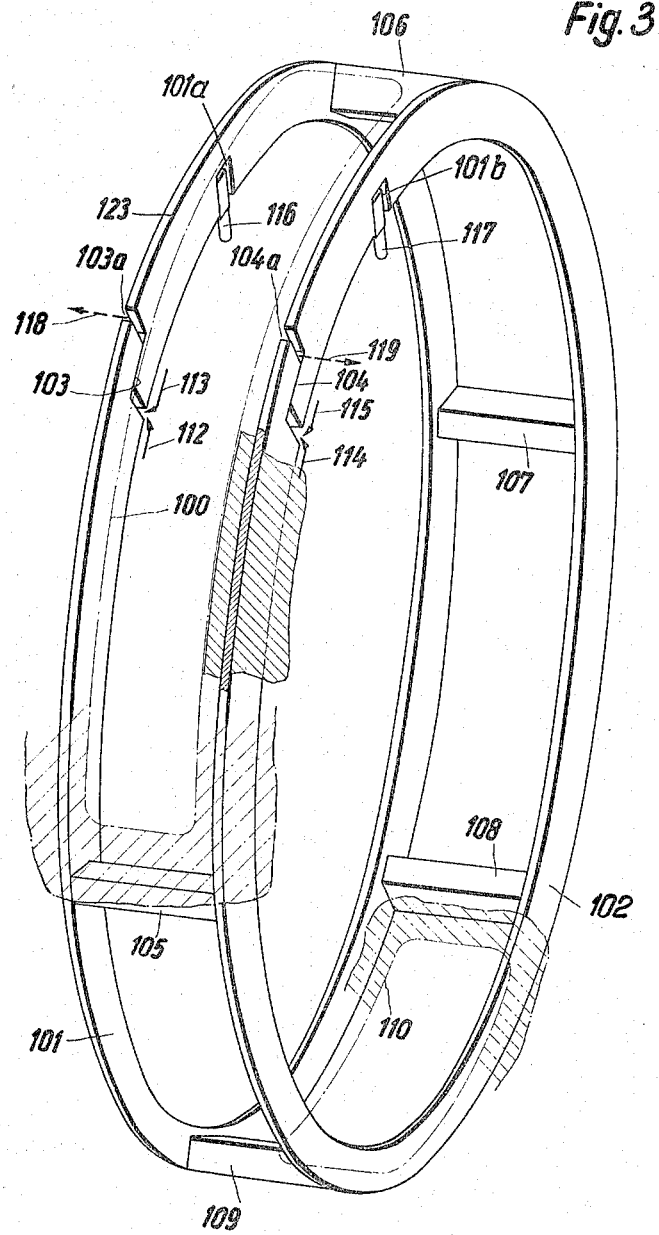

United States Patent Office 3,284,087
Patented Nov. 8, 1966

3,284,087
SEAL FOR SEALING AREAS OF DIFFERENT
PRESSURES WITH REGARD TO EACH OTHER
Friedrich W. Lück, Berlin-Frohnau, Germany, assignor to
Borsig Aktiengesellschaft, Berlin-Tegel, Germany, and
Wankel G.m.b.H., Lindau (Bodensee), Germany
Filed Dec. 2, 1963, Ser. No. 327,407
Claims priority, application Germany, Dec. 6, 1962,
B 69,894, B 73,478
10 Claims. (Cl. 277—58)

The present invention relates to a seal or a sealing frame member to be mounted in a gap between two surfaces located in different planes, for sealing areas of different pressure with regard to each other. Sealing members of this type comprise sealing strips which are located in grooves in one surface, and by means of a gas pressure or by spring pressure are sealing pressed against the other surface. The surfaces confining the gap may be of plane, cylindrical, spherical or similar contour.

Various arrangements are known for sealing relative to each other and toward the outside areas under different pressure. All of these heretofore known arrangements comprise sealing strips which at their joints are sealed in a more or less gapless manner by means of auxiliary elements. Such auxiliary elements may consist of triangular or trapezoidal members, sealing rollers, or of a pair of sealing strips inserted in a groove and braced relative to each other.

These auxiliary elements have the drawback that they are expensive and relatively small and, therefore, can get lost or be overlooked.

It is, therefore, an object of the present invention to provide a sealing arrangement which will overcome the above-mentioned drawbacks.

It is another object of this invention to provide a sealing arrangement of the above general type in which the sealing strips are so designed that while overcoming the above mentioned drawbacks, they will still be simple to assemble.

It is another object of this invention to provide a sealing arrangement including longitudinal and transverse sealing strips, in which each of the longitudinal sealing strips may have overlapping end portions, and in which means are provided which will prevent gas under pressure from blowing through between gaps at the end faces of said overlapping portions.

These and other objects and advantages of the invention will appear more clearly from the following specification in connection with the accompanying drawings, in which:

FIGURE 1 illustrates an isometric view of a portion of a sealing arrangement or sealing cage for sealing a gap the confining surfaces of which are located in two parallel planes;

FIGURE 2 is a section along the line II—II of FIGURE 1; FIGURE 2a is a section along the line IIa—IIa of FIGURE 2;

FIGURE 3 illustrates a sealing arrangement as it would look when the various parts are in assembled condition and in sealing engagement with each other, this sealing arrangement being intended for gaps to be sealed which are confined by round surfaces;

FIGURES 4a and 4b respectively illustrate in side view and in top view a joint of a longitudinal strip in combination with a plate insert;

FIGURES 5a and 5b respectively illustrate a side view and top view of a modified joint of a longitudinal strip while employing a lateral cover plate;

FIGURES 6a and 6b respectively illustrate a side view and top view of two sealing strips located in a groove, with the joints of said sealing strips offset with regard to each other.

A sealing arrangement according to the present invention, which may be composed of two straight or annular longitudinal strips and interposed transverse strips, is characterized primarily in that the transverse strips consist of heat expansible, slightly yieldable deformable material as, for instance, of elastically or plastically slightly deformable material, such as synthetic resins, polyamides, tetrafluorethylene, and rubberlike materials, so that when the parts of the sealing arrangement have been assembled, and pressure has been developed between the areas to be sealed, and the transverse strips have expanded due to the influence of developed heat, a gapless seal between the transverse strips and longitudinal strips will be assured.

More specifically with reference to FIGS. 1 and 2, the sealing arrangement illustrated therein comprises longitudinal strips 1 and 2 having interposed therebetween transverse strips 3, 4. Said strips 1, 2, 3 and 4 confine an area or field 5 which is followed by any desired number of fields, for instance fields 6 and 7, by adding a corresponding number of transverse strips. The said transverse strips which, as stated above, consist of slightly deformable plastic or elastic material, are preferably reinforced by bend-resistant pins 8, 9 the total length of which is somewhat less than the length of the respective transverse strip reinforced thereby, as is clearly shown in FIG. 2. In this way the deformability of the said transverse strips at their ends and their sealing effect with the adjacent portions of the longitudinal strips 1, 2 will not be affected by the reinforcing pins.

The longitudinal strips 1, 2 rest in grooves 10, 11 of a supporting body 14, while the transverse strips 3, 4 rest in transverse grooves 13 of said supporting body 14. Those sides or edges 1a, 2a of said longitudinal strips 1, 2 which face away from the grooves 10, 11 engage another body 15 which may be provided with one or more openings 16 and may be slidable along said surfaces 1a, 2a. In order to prevent possible damage to the transverse strips 3, 4 by the body 15 if the latter should be slightly bent inwardly, the transverse strips are provided with inclines 17, 18.

As has been mentioned above, the transverse strips are made of a material which has a certain elasticity or a slight plastic deformability. Preferably, materials of this type are employed which have a higher heat expansion coefficient than the surrounding supporting bodies 14 and 15.

The transverse strips 3, 4 are fitted between the longitudinal strips 1, 2 with a slight gap 19, depending on the temperature of operation to be expected, so that in operation, these gaps will completely disappear. In this connection there exists the possibility that the longitudinal strips 1, 2 are braced against the outer groove walls 20. These forces, however, are relatively light with regard to the forces which would occur if non-deformable transverse strips were inserted between the longitudinal strips. When employing transverse strips, in conformity with the present invention, of plastically deformable material, the tension normally prevailing at a standstill of the bodies 14, 15 will be reduced so that functional disorders of the sealing arrangement will safely be avoided. In other words, with reference to FIG. 2 it will be appreciated that when the bodies 14, 15 are in operation, the body 14, under the influence of heat, expands while similarly the transverse strips 3, 4 expand but to a greater extent than body 14 so that strips 1, 2 will be pressed against the walls 20 by the strips 3, 4. When the body 14 cools down, in inoperative condition thereof, it contracts again, i.e. also in the direction of the longitudinal extension of said strips 3, 4, while the strips 3, 4 do not or only to a very slight extent reduce their lengths. Consequently, strips 1, 2 are now pressed against the wall 20 at a greater pressure than was the case during operation.

The employment of relatively soft materials requires the arming of the transverse strips with bend-resistant pins 8, 9, especially when said transverse strips are passed over by sliding surfaces with recesses or openings 16 therein. These pins also afford the possibility more precisely to adapt the deformability of the transverse strips to the operation by reducing the length of said pins even further. The ends of the transverse strips will then be freely deformable whereas the central portions of the transverse strips will not be deformable in view of the steel pins which may be inserted under preload into the transverse strips or are glued thereto.

In operation, the transverse strips will, with the longitudinal strips, form a gapless seal at the important portions. The leak gases which enter the bottom portions of grooves 12, 13 are, however, still able, without encountering resistance, to pass into the bottom portion 10, 11 of the longitudinal grooves and may from there flow to portions of lower pressure. In order to prevent this, the grooves 10, 11 are considerably deeper than the grooves 13 whereby the longitudinal strips 1, 2 will block the passage of the gases from grooves 13 toward the outside. While the remaining sealing gaps 21 will not have an ideal sealing effect, they will come close to it because the sealing gaps 21 are extremely narrow and merely have to seal the gas which passed through a sealing gap, viz. through the gap at the flanks of the transverse strips, said sealing gaps 21 having a width of one thousandth of an inch for instance.

So far, the heat expansion of the longitudinal strips in longitudinal direction has not been considered. Such heat expansion, however, will in most instances, be unavoidable.

When employing annular longitudinal strips as they are used in particular with rotary machines, the joints may, in most instances, be located in the zones of lower pressure, so that the sealing of the leak gases below the longitudinal sealing strips will require preferred attention over the sealing against gases which tend to flow through the gaps of the annular longitudinal strips toward the outside.

The overlapping joint arrangements as they are customary with piston rings can, therefore, not be employed in this instance in order to produce an effective seal of the joints of the longitudinal strips against the passage of leak gases below said sealing strips.

In order to obtain such effective sealing, according to a further development of the present invention, each of two adjacent ends of the longitudinal strips is provided with a tongue or extension overlapping a corresponding tongue or extension of the other strip end.

In order to assure a complete seal of the joints of the longitudinal strips also in such instances in which either the annular strips have to be subdivided a plurality of times as is the case, for instance, with very large machines, or with machines in which the suction pressure is higher than the surrounding pressure, as is the case, for instance, with second and third stages of compressors, the following arrangement may be provided in conformity with the present invention. According to this arrangement, in a radial groove provided in one joint end but not extending all the way through the strip, there is inserted a plate which is loose or connected to the said joint end, and this plate extends into a corresponding groove of the other joint end and is flush with the sliding surface of the longitudinal strip.

More specifically referring to FIG. 3, the arrangement shown therein represents a sealing arrangement as it may be used with a rotary piston compressor. The sealing arrangement of FIG. 3 comprises the annular longitudinal strips 101 and 102 with radially overlapping joints 103 and 104 and with transverse strips 105, 106, 107, 108 and 109. Between the transverse strips 105 and 106 there is indicated in dot-dash lines the inlet passage 100 for the gas to be compressed, and between the transverse strips 108 and 109 there is indicated in dot-dash lines the outlet 110 for the compressed gas. Leak gases escaping from the pressure connection pass into free annular chambers located between the annular strips 101 and 102 and the bottoms of the grooves receiving same. These escaped gases try to escape through the joints 103 and 104 located at the suction side—the places of lowest pressure—in the direction indicated by the arrows 112, 113, 114 and 115. The radially superimposed tongues or extensions of joints 103 and 104 prevent such escape of the leak gases.

It may be assumed that the gas in the suction connection is, in this instance, of atmospheric pressure, in which instance it will not escape through the gaps 103a and 104a facing the sliding surface 123.

In order to prevent an undue movement of the longitudinal strips, pins 116, 117 are inserted into the bottom of groves corresponding to grooves 10 and 11 which receive the annular strips 101, 102 and extend into recesses 101a, 101b respectively, provided in the strips 101, 102. In this way also an undesired displacement of the joints 103, 104 in view of the tangential frictional forces, will be avoided. The joints 103 and 104 are thus prevented from displacing themselves toward portions of higher pressure.

If a pressure above atmospheric pressure prevails in the suction connection, as is the case, for instance, in the second or higher compression stages, it is necessary to close those gaps 103a, 104a which face the sliding surface 123, in order to prevent leak gas from escaping in the direction of the arrows 118, 119.

FIGS. 4a and 4b illustrate an arrangement in side view and top view, respectively, which will close such joint gap. As will be seen from these figures, a plate 120 is arranged in radial grooves 35a, 35b provided in the joint ends 121a, 121b. These grooves 35a, 35b do not extend all the way through the strips. Plate 120 is connected to the joint end 121b, for instance, by rivets 22. Joint 120 is flush with the sliding surface 123 of the longitudinal strip 121 and blocks the gap 24 against transverse flow.

Another sealing possibility, according to the present invention, consists in providing a lateral recess in the two adjacent joint ends and inserting therein a plate which is fixedly connected with one joint end and flush with the sliding surface of the longitudinal strip. Such an arrangement is shown in FIGS. 5a and 5b, in which the joint gap 25 is blocked by a plate 26 which is inserted in laterally milled-out portions 36a, 36b of the joint ends 27a, 27b of longitudinal strip 27 and is connected by rivets 22 to the joint ends 27a.

According to another embodiment of the invention, it is also possible to provide two longitudinal strips or strip means adjacent to each other in side by side arrangement with radially overlapping joints in one groove of the supporting body, while the joints are offset with regard to each other in longitudinal direction of the strips or strip means. Such an arrangement is shown in FIGS. 6a and 6b. As will be seen therefrom, the longitudinal strips 28 and 29 are so arranged adjacent each other in a longitudinal groove of the supporting body that the joints are offset in longitudinal direction, and the joint gaps 30 and 31 facing the sliding surface 123 and also the joint gaps 32 and 33 facing away from sliding surface 123, are blocked by the respective other longitudinal strip.

It is, of course, to be understood, that the present invention is, by no means, limited to the particular constructions shown in the drawings, but also comprises any modifications within the scope of the appended claims. Thus, it is also within the scope of the present invention, particularly when annular longitudinal strips are employed for very small machines, to design such strips as closed strips or to provide the same with straight joint surfaces and a very narrow joint gap, because in such an instance the changes in length of the sealing strips and the wear thereof along the sliding surface are, due to the low sliding speeds, only very slight.

It may be added that while the arrangement of FIGS. 1 and 2 is useful for many purposes, it has proved particularly useful in connection with rotary machines as for instance rotary piston compressors, rotary expansion engines, rotary pumps or rotary combustion engines. While the transverse strips 3, 4 have been described as consisting of one and the same material, it is, of course, to be understood that it will be possible that only the end portions are made of yieldable and deformable material.

What I claim is:

1. In combination with a first and second body movable relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves longitudinally extending in a direction transverse to the longitudinal direction of said first grooves and being spaced from each other in longitudinal direction of said first grooves, a sealing arrangement, which includes: at least one pair of first sealing strips respectively arranged in said first grooves for sealing engagement with said second surface, and a plurality of second sealing strips respectively arranged in said second grooves and interposed between said first strips, at least the end portions of said second strips consisting of slightly yieldable and deformable material and being adapted in condition of operation of said bodies sealingly to engage the respective adjacent portions of said first strips thereby in cooperation with the latter to seal said areas relative to each other when said bodies are in operation.

2. An arrangement according to claim 1, in which said second strips are armed by stiffening members spaced from the respective adjacent portions of said first strips.

3. An arrangement according to claim 1, in which the second strips have that surface thereof which faces said second body provided with a tapered portion tapering in the direction toward said first body.

4. An arrangement according to claim 1, which includes pin means arranged in said first grooves and extending into the first strip means for preventing the latter from longitudinally sliding in the respective first groove means pertaining thereto.

5. In combination with a first and second body movable relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves longitudinally extending in a direction transverse to the longitudinal direction of said first grooves and being spaced from each other in longitudinal direction of said first grooves, a sealing arrangement, which includes: at least one pair of first sealing strips respectively arranged in said first grooves for sealing engagement with said second surface, and a plurality of second sealing strips respectively arranged in said second grooves and interposed between said first strips, at least the end portions of said second strips consisting of slightly yieldable and deformable heat-expansive material of a higher heat expansion coefficient than that of said first body and being adapted in condition of operation of said bodies sealingly to engage the respective adjacent portions of said first strips thereby in cooperation with the latter to seal said areas relative to each other when said bodies are in operation.

6. In combination with a first and second body movable relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves having a depth less than the depth of said first grooves and longitudinally extending in a direction transverse to the longitudinal direction of said first grooves and being spaced from each other in longitudinal direction of said first grooves, a sealing arrangement, which includes: at least one pair of first sealing strips respectively arranged in said first grooves and overlapping the ends of said second grooves for sealing engagement with said second surface, and a plurality of second sealing strips respectively arranged in said second grooves and interposed between said first strips, at least the end portions of said second strips consisting of slightly yieldable and deformable material and being adapted in condition of operation of said bodies sealingly to engage the respective adjacent portions of said first strips thereby in cooperation with the latter to seal said areas relative to each other when said bodies are in operation.

7. In combination with a first and second body movble relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves longitudinally extending in a direction transverse to the longitudinal direction of said first grooves and being spaced from each other in longitudinal direction of said first grooves, a sealing arrangement, which includes: at least one pair of first sealing strips respectively arranged in said first grooves for sealing engagement with said second surface, each of said first strips including a joint comprising two strip portions each of which is provided with an extension, said extensions respectively extending in opposite dicetions with regard to each other and being in overlapping engagement with each other, and a plurality of second sealing strips respectively arranged in said second grooves and interposed between said first strips, at least the end portions of said second strips consisting of slightly yieldable and deformable material and being adapted in condition of operation of said bodies sealingly to engage the respective adjacent portions of said first strips thereby in cooperation with the latter to seal said areas relative to each other when said bodies are in operation.

8. An arrangement according to claim 7, in which said extensions have their end faces spaced from each other so as to define a gap therebetween, and in which said end portions are respectively provided with aligned slot means extending in the longitudinal direction of said extensions and extending to the end faces thereof, plate means being inserted in said aligned slot means and extending through and across said gap.

9. In combination with a first and second body movable relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves longitudinally extending in a direction transverse to the longitudinal direction of said first grooves and being spaced from each other in longitudinal direction of said first grooves, a sealing arrangement, which includes: at least one pair of first sealing strips respectively arranged in said first grooves for sealing engagement with said second surface, each of said first sealing strips including a joint comprising two strip portions arranged in longitudinal alignment with but spaced from each other so as to define a gap therebetween, each of said two strip portions having a lateral cutout located at one and the same side of said strip portions and extending from said gap to an area spaced from said gap, plate means inserted in the cutout of one of said strip portions and connected thereto and extending across said gap into the cutout of said other strip portion, said cutout and said plate means having their upper edges substantially flush with the surface of said first strip means which faces said second surface, and a plurality of second sealing strips respectively arranged in said second grooves and interposed between said first strips, at least the end portions of said second strips consisting of slightly yieldable and deformable material and being adapted in condition of operation of said bodies sealingly to engage the respective adjacent portions of said first strips thereby in cooperation with the latter to seal said areas relative to each other when said bodies are in operation.

10. In combination with a first and second body movable relative to each other and respectively having a first and second surface confining with each other a gap with spaced areas of different pressure, said first surface being provided with first grooves extending in longitudinal direction of said gap and being spaced from each other in a direction transverse to the longitudinal direction of said gap, said first surface also having therein a plurality of second grooves longitudinally extending in a direction transverse to the longitudinal direction of said first grooves and being spaced from each other in longitudinal direction of said first grooves, a sealing arrangement, which includes: two first strip means arranged side by side in one of said first grooves for sealing engagement with said second surface, two further first strip means arranged side by side in another one of said first grooves for sealing engagement with said second surface, each two first strip means in one and the same first groove having two strip portions arranged in longitudinal alignment with but spaced from each other so as to define a gap therebetween but with said gaps offset with regard to each other in the longitudinal direction of said first strip means, and a plurality of second strip means respectively arranged in said second grooves and interposed between said first strip means, at least the end portions of said second strip means consisting of slightly yieldable and deformable material and being adapted in condition of operation of said bodies sealingly to engage the respective adjacent portions of said first strip means thereby in cooperation with the latter to seal said areas relative to each other when said bodies are in operation.

References Cited by the Examiner
FOREIGN PATENTS

| | | |
|---|---|---|
| 485,877 | 2/1918 | France. |
| 1,271,678 | 8/1961 | France. |
| 938,827 | 10/1963 | Great Britain. |

LAVERNE D. GEIGER, *Primary Examiner.*

J. MEDNICK, *Assistant Examiner.*